(12) United States Patent
Kapadia et al.

(10) Patent No.: US 9,008,095 B2
(45) Date of Patent: Apr. 14, 2015

(54) SYSTEM AND METHOD FOR HARDWARE-BASED LEARNING OF INTERNET PROTOCOL ADDRESSES IN A NETWORK ENVIRONMENT

(71) Applicant: Cisco Technology, Inc., San Jose, CA (US)

(72) Inventors: Shyam Kapadia, Santa Clara, CA (US); Nilesh Shah, Fremont, CA (US); Putu H. Subagio, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 13/633,734

(22) Filed: Oct. 2, 2012

(65) Prior Publication Data
US 2014/0092901 A1 Apr. 3, 2014

(51) Int. Cl.
| | |
|---|---|
| H04L 12/28 | (2006.01) |
| H04L 12/56 | (2006.01) |
| H04L 12/751 | (2013.01) |
| H04L 12/741 | (2013.01) |
| H04L 29/12 | (2006.01) |

(52) U.S. Cl.
CPC ............. *H04L 45/08* (2013.01); *H04L 45/74* (2013.01); *H04L 29/12811* (2013.01); *H04L 45/745* (2013.01); *H04L 61/6009* (2013.01)

(58) Field of Classification Search
None
See application file for complete search history.

(56) References Cited

U.S. PATENT DOCUMENTS

| | | | |
|---|---|---|---|
| 6,256,314 B1 * | 7/2001 | Rodrig et al. ................. | 370/401 |
| 6,807,175 B1 * | 10/2004 | Jennings et al. ............. | 370/390 |
| 6,934,260 B1 * | 8/2005 | Kanuri ........................... | 370/255 |
| 7,079,537 B1 * | 7/2006 | Kanuri et al. ................. | 370/392 |
| 8,204,061 B1 | 6/2012 | Sane et al. | |
| 8,694,664 B2 | 4/2014 | Jain et al. | |
| 2003/0012202 A1 * | 1/2003 | Fukutomi ................ | 370/395.52 |
| 2007/0028070 A1 * | 2/2007 | Avergun et al. ............... | 711/172 |
| 2007/0081530 A1 * | 4/2007 | Nomura et al. ............... | 370/389 |
| 2007/0195793 A1 * | 8/2007 | Grosser et al. ........... | 370/395.53 |
| 2010/0316053 A1 * | 12/2010 | Miyoshi et al. ............... | 370/392 |
| 2012/0014386 A1 | 1/2012 | Xiong et al. | |
| 2012/0027017 A1 | 2/2012 | Rai et al. | |

(Continued)

OTHER PUBLICATIONS

U.S. Appl. No. 13/658,610, filed Oct. 23, 2012 entitled "System and Method for Optimizing Next-Hop Table Space in a Dual-Homed Network Environment," Inventors: Shyam Kapadia, et al.

(Continued)

*Primary Examiner* — Ayaz Sheikh
*Assistant Examiner* — Peter Chau
(74) *Attorney, Agent, or Firm* — Patent Capital Group

(57) ABSTRACT

A method is provided one example embodiment and includes receiving a packet including a source /32 address and a destination /32 address. The source /32 address can indicate an Internet Protocol (IP) address of a source host that sent the packet. The destination /32 address can indicate an IP address of a destination host to which the packet is destined. The method may also include looking up the destination /32 address and the source /32 address in a Forwarding Information Base/adjacency (FIB)/(ADJ) table implemented in a hardware of a leaf switch in a network. Additionally, the method may include adding the source /32 address and corresponding adjacency information to the FIB/ADJ table if the destination /32 address is found in the FIB/ADJ table, and the source /32 address is not found in the FIB/ADJ table. The method may also include forwarding the packet to the destination host.

20 Claims, 8 Drawing Sheets

(56) References Cited

U.S. PATENT DOCUMENTS

| | | |
|---|---|---|
| 2012/0236761 A1 | 9/2012 | Yang et al. |
| 2013/0039218 A1 | 2/2013 | Narasimhan et al. |
| 2013/0094357 A1 | 4/2013 | Sankar et al. |
| 2013/0194964 A1* | 8/2013 | Basso et al. .................. 370/254 |
| 2013/0308641 A1 | 11/2013 | Ackley |
| 2014/0044126 A1 | 2/2014 | Sabhanatarajan et al. |

OTHER PUBLICATIONS

U.S. Appl. No. 13/682,534, filed Nov. 20, 2012 entitled "System and Method for Optimizing Within Subnet Communication in a Network Environment," Inventors: Shyam Kapadia, et al.

"Brocade VCS Fabric Technical Architecture," Brocade Communications Systems, Data Center Technical Brief, Aug. 2012; 64 pages.

Cisco Systems, Inc., "Cisco Nexus 5000 Series NX-OS Operations Guide, Release 5.1(3)N1(1) Glossary," Jun. 11, 2012; 5 pages.

Cisco Systems, Inc., "Chapter 13: Configuring the MAC Address," Cisco Nexus 5000 Series Switch CLI Software Configuration Guide, Apr. 2012.

Cisco Systems, Inc., "Cisco FabricPath Design Guide: Using FabricPath with an Aggregation and Access Topology," Dec. 2011; 54 pages.

Cisco Systems, Inc., "Layer 2 Multi-Path (L2MP) Overview," Presentation, Jul. 2011; 48 pages.

Cisco White Paper, "Cisco FabricPath for Cisco Nexus 7000 Series Switches," Cisco Systems, Inc., Sep. 7, 2011, 44 pages.

Hinden, R., et al. "IP Version 6 Addressing Architecture," Internet Engineering Task Force, Request for Comments 4291, Feb. 2006.

Zhang, Mingui, "To Address the Space Limitation of Inner VLAN," Internet Draft draft-zhang-trill-vlan-extension-00.txt, May 31, 2011.

Himanshu Shah et al., "ARP Broadcast Reduction for Large Data Centers," Oct. 25, 2010, 12 pages; http://tools.ietf.org/html/draft-shah-armd-arp-reduction-01.

Aled Edwards et al., "Diverter: A New Approach to Networking Within Virtualized Infrastructures," WREN'09, Proceedings of the 1st ACM workshop on Research on enterprise networking, Barcelona, Spain, Aug. 21, 2009, 8 pages.

Changhoon Kim, et al., "Floodless in Seattle: A Scalable Ethernet Architecture for Large Enterprises," SIGCOMM '08 Proceedings of the ACM SIGCOMM 2008 conference on Data communication, Seattle, WA, Aug. 17-21, 2008, 14 pages.

Fulcrum Microsystems, "FocalPoint in Large-Scale Clos Switches: A new silicon generation enables a new datacenter switching paradigm," White Paper, Oct. 2007, 10 pages; www.fulcrummicro.com/product_library/applications/clos.pdf.

R.N. Mysore, et al., "PortLand: A Scalable Fault-Tolerant Layer 2 Data Center Network Fabric," Proceedings of Proceedings of the ACM SIGCOMM 2009 conference on Data communication, SIGCOMM'09, Barcelona, Spain, Aug. 17-21, 2009, 12 pages.

N. J. Lippis, III, "A simpler Data Center Fabric Emerges for the Age of Massively Scalable Data Centers," Jun. 2010, 12 pages; http://www.cisco.com/en/US/prod/collateral/switches/ps9441/ps9402/Data_Center_Net_Fabric.pdf.

USPTO May 9, 2014 Non-Final Office Action from U.S. Appl. No. 13/658,610.

USPTO Sep. 25, 2014 Notice of Allowance from U.S. Appl. No. 13/658,610.

USPTO Sep. 12, 2014 Non-Final Office Action from U.S. Appl. No. 13/682,534.

* cited by examiner

SYSTEM AND METHOD FOR HARDWARE-BASED LEARNING OF INTERNET PROTOCOL ADDRESSES IN A NETWORK ENVIRONMENT

TECHNICAL FIELD

This disclosure relates in general to the field of communications and, more particularly, to a system and a method for hardware-based learning of Internet Protocol (IP) addresses in a network environment.

BACKGROUND

Data centers are increasingly used by enterprises to achieve collaboration, to store data, to manage resources, etc. A typical data center network contains myriad network elements, including servers, load balancers, routers, switches, etc. The network connecting the network elements provides secure user access to data center services and an infrastructure for deployment, interconnection, and aggregation of shared resource as required, including applications, servers, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and, further, optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided one example embodiment and includes receiving a packet including a source /32 address and a destination /32 address. The source /32 address can indicate an Internet Protocol (IP) address of a source host that sent the packet. The destination /32 address can indicate an IP address of a destination host to which the packet is destined. The method may also include looking up the destination /32 address and the source /32 address in a Forwarding Information Base/adjacency (FIB)/(ADJ) table implemented in a hardware of a leaf switch in a network. Additionally, the method may include adding the source /32 address and corresponding adjacency information to the FIB/ADJ table if the destination /32 address is found in the FIB/ADJ table, and the source /32 address is not found in the FIB/ADJ table. The method may also include forwarding the packet to the destination host.

In specific embodiments, the method may further include dropping the packet if the destination /32 address and the source /32 address are not found in the FIB/ADJ table. The method may also include looking up a destination subnet having a /24 address corresponding to the destination /32 address and multicasting the packet to the destination subnet and other features if the destination /32 address is not found in the FIB/ADJ table, and the source /32 address is found in the FIB/ADJ tables. In other embodiments, the method further includes configuring subnet prefixes of (e.g., substantially all) subnets in the network in the FIB/ADJ table, installing (for example, in the FIB/ADJ table) /32 addresses of hosts connected to the leaf switch.

Example Embodiments

Figure 1:
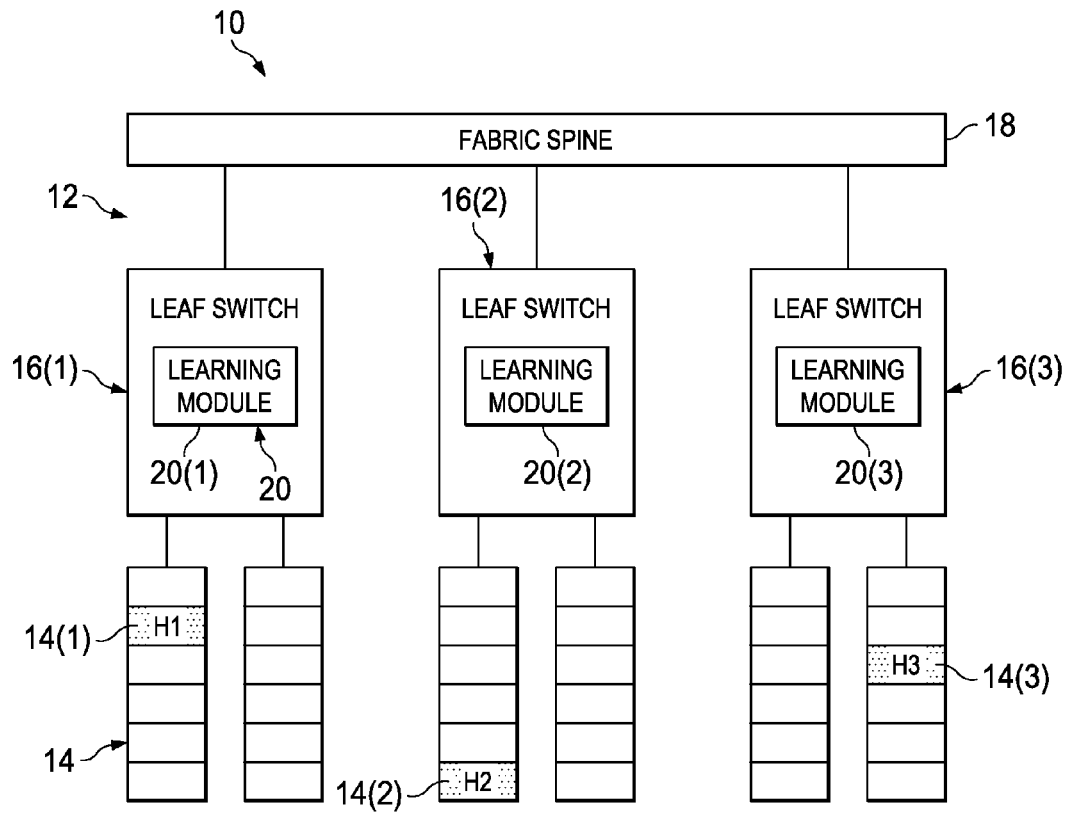
FIG. 1 is a simplified block diagram illustrating a system for hardware-based learning of IP addresses in a network environment.

Turning to FIG. 1, FIG. 1 is a simplified block diagram illustrating a communication system 10 for hardware-based learning of IP addresses in a network environment. Communication system 10 includes a network 12 (generally shown as links) that connects hosts 14 (e.g., hosts 14(1), 14(2), 14(3)) over leaf switches 16 (e.g., leaf switches 16(1), 16(2), 16(3)) over a fabric spine 18. Leaf switches 16 may include learning modules 20 (e.g., learning modules 20(1), 20(2), and 20(3)) to enable hardware-based learning of IP addresses in network 12. Assume, merely for illustrative purposes, and not as a limitation, that hosts 14(1), 14(2) and 14(3) are connected respectively to leaf switches 16(1), 16(2), and 16(3), and each leaf switch 16(1)-16(3) may include respective learning modules 20(1)-20(3).

Certain terminologies are used with regard to the various embodiments of communication system 10. As used herein, the term "host" may include any network element, physical or virtual, connected to other network elements over a network. Hosts may provide data and other services to the network elements. In a client-server model, hosts may include servers. In a peer-to-peer network, each computer may be a host. Hosts may also include computers participating in networks that use Internet Protocol (IP). In a general sense, each host has a specific, unique address (e.g., IP address) associated therewith. Hosts can include physical computers (e.g., servers), and virtual machines (VMs).

As used herein, the term "network element" can encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

As used herein, the term "leaf switch" is inclusive of routers, switches and such other network elements with packet routing, bridging, and switching functionalities that are directly connected to one or more hosts. The term "fabric spine" is inclusive of routers, switches and such other network elements with packet routing, bridging, and switching functionalities that connect one or more leaf switches.

For purposes of illustrating the techniques of communication system 10, it is important to understand the communications in a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Traditionally, in a three-tier network architecture with core, aggregation, and access layers, Layer 2 forwarding (e.g., using Media Access Control (MAC) address) occurs within the access layer, and Layer 3 forwarding (e.g., using Internet Protocol (IP) address) occurs within the aggregation and core layers. Traditionally, hardware-based learning was confined to Layer 2 MAC address learning at the access layer for quicker convergence, eliminating any software intervention that could cause significant delays and working in a plug-n-play fashion. However, massively scalable data center environments (MSDC) generally have millions of servers with any-to-any communication capability. Layer 3 uses hierarchical IP addressing with longest prefix matching (LPM) and can therefore scale better than Layer 2; thus, the need to limit broadcast domains has resulted in MSDC architectures using Layer 3 Top of Rack (ToR) switches.

Turning to the differences between Layer 2 and Layer 3 switching, a Layer 2 switch learns the incoming packet's source MAC address against the interface, on which it received the packet. The association between the source MAC address and the interface is written to a forwarding table typically called Layer 2 forwarding table or the MAC table. The terms "packet" and "frame" may be interchangeably used in this Specification to refer to formatted data units transmitted in the network. When the Layer 2 switch subsequently receives a frame (e.g., a data unit at Layer 2) with a destination MAC address in its forwarding table, it sends the frame out the interface stored in the forwarding table. If the Layer 2 switch has not seen the MAC address yet, it floods the frame out of the active interfaces (e.g., as is also done with broadcast frames), except for the interface on which the frame was received. Layer 2 MAC address based forwarding algorithm may be implemented in hardware (e.g., in a switching chip).

The terms "Layer 3 switch" and "router" may be used interchangeably in this Specification to refer to a network element that forwards packets using Layer 3 parameters (e.g., IP address). Unlike Layer 2 switches, Layer 3 switches may perform IP switching (rather than MAC switching) at the hardware level. In Layer 3 switching, a Forwarding Information Base (FIB) table in hardware (e.g., a suitable memory element) maintains a platform specific image of the forwarding information contained in an IP routing table. IP forwarding in Layer 3 switches can involve topology-based switching, in which the Layer 3 switch builds a lookup table (i.e., IP routing table) and populates it with the entire network's topology. The database can be held in hardware and referenced there to maintain high throughput. The routers may run routing protocols such as Open Shortest Path First (OSPF) or Routing Information Protocol (RIP) to communicate with other Layer 3 switches or routers and build their IP routing tables. When routing or topology changes occur in the network, the IP routing table is updated, and those changes are reflected in the FIB. The FIB maintains next hop address information based on the information in the IP routing table.

IP processing, which typically causes the length of the IP header to vary, complicates the building of a hardware-forwarding engine. Moreover, a large number of IP packets do not include IP options, so, it may be overkill to design IP processing into silicon (e.g., in a semiconductor chip). The compromise is that the most common (e.g., fast path) forwarding decision is designed into silicon, whereas the others are handled typically by a Central Processing Unit (CPU) on the Layer 3 switch via suitable software, and therefore, prone to delays.

Typical data center architectures with Layer 3 ToRs have servers attached to the ToR switches (e.g., leaf switches 16) that are in turn interconnected via a fabric spine (e.g., fabric spine 18). For example, the data center network architecture may include a 2-tier spine-leaf topology (extensible to multiple tiers) where there may be a separation between the end-station address space and topology space to allow the two to be independently scaled. In such a model, the end-station addresses are expected to communicate to the leaf switches via a standard protocol (e.g., internal Border Gateway Protocol (iBGP) or central database/controller based scheme). Software on the leaf switches can then cache the entries and decide based on active conversations, the FIB entries that may be stored in hardware.

In addition to the FIB, leaf switches may use adjacency tables to pre-append Layer 2 addressing information. The adjacency table maintains Layer 2 next-hop addresses (e.g., adjacent node addresses) for the FIB entries. Nodes in the network are said to be adjacent if they can reach each other with a single hop across a link layer. Each adjacency entry stores pre-computed frame headers that are used for forwarding a packet using a FIB entry referencing the corresponding adjacency entry. The adjacency table is populated as adjacencies are discovered. Each time an adjacency entry is created, such as from an Address Resolution Protocol (ARP) protocol (e.g., protocol used for resolution of network layer addresses into link layer addresses), a link-layer header for that adjacent node is pre-computed and stored in the adjacency table.

In typical fat-tree architectures with spine and leaf topology, a Layer 2 learning mechanism may be implemented as follows. The switch chips in the fat tree, including the spine switches, contain tables that are populated with global port identifiers. For attached hosts to communicate with each other through the fat tree network, an association between the hosts' MAC addresses and the port identifiers for the ports they are connected to are learned by the leaf switches. For example, consider host A, attached to port 1 on a leaf switch L1 communicates with host B, attached to port 276, on leaf switch L24. When a first frame sourced from host A enters L1, the L1 switch does not know the association between the frame's destination address (host MAC B) and the global port to which it is connected. L1 then floods the frame out its ports and sends the frame to one of the spine switches, say S1.

The frame sent to the spine switch S1 has been tagged by L1 to indicate the source of the frame (e.g., L1's port), but the destination port identifier within the tag is unknown, so a "flood" identifier is placed there by the leaf switch L1. The spine switch floods copies of the frame to the leaf switches (except L1) in the network in response to the flood identifier it detects in the tag. L24 receives the frame on its internal port connected to S1, say port 14. L24 and the other leaf switches (except L1) receive the frame and flood copies out their network ports. Host B eventually receives the frame via port 276 on L24.

During this process, source port associations have been learned along the way. L1 learned the association between MAC A and global port 1. S1 associated port 1's 16-bit global source port identifier for host A (assigned to the frame by L1) with its own port 1. Finally, L24 associated the port identifier for host A with its port 14. When communication occurs in the reverse direction, from host B to host A, S24 may receive the frame first. It tags the frame with the destination port identifier corresponding to host A. At this point, the identifier-to-port associations have been learned by L24, S2, and L1, allowing the frame to reach host A directly, without any flooding. Learning is at Layer 2, and associations between MAC address and corresponding ports are learnt in hardware.

However, flood/broadcast traffic such as from ARP can cause significant traffic overhead in such a data center architecture and should be limited or even eliminated if possible so as to prevent hosts (e.g., hosts 14) from being unnecessarily bombarded with network traffic. So ARP requests including gratuitous ARPs (GARPs) may be terminated at the leaf switches (e.g., using proxy ARP variants enabled on leaf switches). Consequently, whenever a host wants to talk to another host that is in the same subnet or a different subnet, the host may systematically send a packet to the leaf switch directed to the gateway MAC. The boundary lines of whether a host talks to non-local hosts within the local subnet or to non-local hosts within remote subnets can be blurred.

As used herein, the term "subnet" is a logical grouping of connected network elements. Typically, network elements in the same subnet may share contiguous ranges of IP address numbers. A mask (known as the subnet mask or network mask) can define the boundaries of an IP subnet. In general, a subnet is a Layer 3 construct, compared to a virtual local area network (VLAN), which is a Layer 2 construct. In a network environment employing VLANs, a one-to-one relationship can exist between VLANs and subnets, although it is possible to have multiple VLANs on one subnet (e.g., using private VLANs). VLANs and subnets can provide independent Layer 2 and Layer 3 constructs that map to one another.

Software based schemes that rely on the ARP/Neighbor Discovery (ARP/ND) for implementing conversational IPv4 or IPv6 schemes may be used in some architectures. In addition, the more general scheme of local caching of IP routes from a larger table is currently being used in some architectures. However, in such schemes, later-arriving host routes can create problems associated with latency, CPU load, and out-of-order delivery. Moreover, schemes that require software intervention can have an innate delay as compared to hardware-based schemes. With data centers with millions of servers/hosts, reachability and optimality (e.g., 1-hop routing) can be potentially critical requirements. Any scheme that serves to improve these requirements at Layer 3 would have to coexist seamlessly with other non-IP applications that require L2 bridging.

Communication system 10 is configured to address these issues (and others) in offering a system and method for hardware-based learning of Internet Protocol (IP) addresses in a network environment. Embodiments of communication system 10 can implement conversational hardware-based L3 learning in data-center environments with overlays like Cisco's FabricPath™, Transparent Interconnect with Lots of Links (TRILL), and other network architectures. With hardware-based Layer 3 learning according to embodiments of communication system 10, there is no need for any additional mechanism for distribution of the end-station addresses to substantially all leaf-switches 16. Thus, iBGP or central database based schemes can be eliminated. The Layer 3 addresses can be learnt in hardware at the appropriate leaf switches 16 based on active data flows.

In various embodiments, a packet including a source /32 address and a destination /32 address may be received at a leaf switch (e.g., leaf switch 16(3)) in network 12. As used herein, "/32 address" and "/24 address" refer to host IP address in IPv4, having 32-bit and 24-bit network prefix, respectively. For example, 192.168.1.0/24 is the prefix of the IPv4 network starting at the given address, having 24 bits allocated for the network prefix, and the remaining 8 bits reserved for host addressing. In general, hosts on a subnet have the same network prefix, occupying the most-significant bits of the address. The number of bits allocated within a network to the internal network prefix may vary between subnets, depending on the network architecture. The host identifier is a unique local identification (e.g., a host number on the local network, an interface identifier, etc.). For example, in the IPv4 address 192.168.5.130, the 24-bit network prefix is 192.168.5.0 and the host identifier is 130. In a general sense, host 14 can be identified by a /32 address, whereas the subnet it belongs to may be identified by a /24 (or other) address ("subnet prefix").

The source /32 address can indicate an IP address of a source host (e.g., host 14(1)) that sent the packet, and the destination /32 address can indicate an IP address of a destination host 14(3) to which the packet is destined. The destination /32 address and the source /32 address may be looked up in a FIB/ADJ table of leaf switch 16(3). As used herein, the term "FIB/ADJ table" can include the FIB table, the adjacency table, or a combination thereof. In various embodiments, the FIB/ADJ table may be implemented in hardware (e.g., Static Random Access Memory (SRAM)) of leaf switch 16(3). If the destination /32 address is found in the FIB/ADJ table, but the source /32 address is not found in the FIB/ADJ table, the source /32 address and corresponding adjacency information may be added to the FIB/ADJ table. As used herein, the term "adjacency information" includes source MAC address, destination MAC address, VLAN, etc. and such other information computed from packet headers. The packet may be forwarded subsequently to the destination host (e.g., host 14(3)).

In various embodiments, the packet may be dropped if the destination /32 address is not found in the FIB/ADJ table. If the destination /32 address is not found in the FIB/ADJ table, and the source /32 address is found in the FIB/ADJ table, a destination subnet having a /24 address corresponding to the destination /32 address may be looked up in the FIB/ADJ table, and the packet may be multicast to the destination subnet. The destination subnet may include a set of leaf switches, which host the subnet and receive packets for the multicast group corresponding to the destination subnet.

In operation, packets arriving at one of leaf switches 16 (e.g., leaf switch 16(1)) with destination MAC address (DMAC) being other than the router MAC address (RMAC), may be forwarded according to traditional Layer 2 switching, including Layer 2 learning. For packets received at leaf switch 16(1) with DMAC being the RMAC, routing treatment may depend on the FIB lookup. For server-facing ports, leaf switch 16(1) can learn the source IP address (SIP) if not already present, otherwise, leaf switch 16(1) can reset a SIP/destination IP address (DIP) hit bit.

In embodiments where system-on-chip based forwarding-engines have two FIB tables (e.g., host table where the /32 addresses are stored, and LPM table where typically subnet prefixes are stored), the lookup key to these tables can be [Virtual Routing and Forwarding-identification (VRF-ID), IP]. The VRF-ID is usually a property of the ingress interface. VRF-ID can be learnt when the incoming port-Virtual Local Area Network (VLAN) combination drives a broadcast domain (BD), which in-turn can yield the VRF-ID. The [VRF-IP] combination may be stored in the Layer 3 host table (e.g., FIB) for the newly learnt SIP.

The adjacency associated with the newly learnt SIP may also be appropriately populated in the appropriate adjacency table. In an example embodiment, fields of interest in the adjacency table can include DMAC, egress-VLAN, and egress-interface. The SMAC can be automatically populated to be a pre-configured RMAC or learnt from the DMAC in the incoming frame. Any other fields can be populated based on the incoming frame, for example, the SMAC populated from the incoming frame may be written as the DMAC in the adjacency table; the incoming VLAN may be populated as the egress-VLAN when sending packets towards the destination IP; and the incoming port can be the egress interface.

For spine-facing ports, for a packet received from a spine uplink, if DIP is a local hit (e.g., primary entry), learning module 20(1) may learn the SIP and forward the packet to the appropriate server (e.g., host 14(1)). If DIP is not a local hit, the packet may be dropped. Also, in case of a hit (e.g., entry found in FIB/adjacency (FIB/ADJ) tables), the SIP/DIP hit bit may be reset to indicate that the hardware entry is in use and part of an active flow. In general, accessing an entry in the FIB table can result in a lookup table bit setter setting a hit bit. The hit bit may be unset after a predetermined period of time and the entry may be deleted if the hit bit is not reset for a second predetermined amount of time (e.g., to clear the FIB table and make room for additional entries). Resetting the hit bit can enable the entry to remain in the FIB table without being deleted.

When a packet is received from the spine uplink, the packet may have an overlay header (e.g., if TRILL/Fabricpath/LISP etc. is used). In general, overlays can allow fabric spine 18 to be "thin" thereby allowing end-station address scalability without increasing the requirement on the spine hardware tables. In a case where a packet with an overlay header is received, the Layer 3 IP learning may be performed on leaf switch 16(1) after the overlay header has been decapsulated. Specifically, for packets received from fabric spine 18, a [VRF-ID, DIP] lookup may be performed in the FIB/ADJ tables. If the lookup results in a local /32 DIP entry hit, the packet can be forwarded out (e.g., to host 14(1)) and the corresponding SIP in the packet may be learnt in hardware. Otherwise, the packet may be dropped and no learning can be performed. To learn the SIP, three fields to form the adjacency corresponding to the SIP can be derived as follows: (1) the SMAC in the incoming frame can be written as the DMAC in the adjacency table; (2) the incoming VLAN can be written as the egress-VLAN when sending packets towards the DIP; and (3) the outgoing interface to reach the DIP can be stored as a mapping of the source field in the overlay header (e.g., source switch or source RBridge ID in the case of TRILL networks).

In a scenario where routing is performed toward ports facing fabric spine 18, the egress VLAN can be designated to be back-bone VLAN V' when one backbone VLAN per VRF (or potentially customer-id) is employed, so that the adjacency/MAC table entries for remote hosts are not a function of the customer-facing VLAN. In many embodiments, V' can be derived from the tag carried in the packet on egress leaf switch 20(1). In another scenario, where the egress VLAN is not V', the incoming VLAN may be carried in an inner-payload as a 802.1q header.

In other scenarios, for example, where the VLAN-ID is not carried in the packet, VLAN-ID can be derived based on an SIP lookup on a content addressable memory (CAM). Subnet prefixes may be installed in the CAM so that a lookup based on SIP can yield the VLAN-ID. The LPM associated with the FIB may be utilized for this purpose. Typically, for an RPF check, initially, the SIP is looked up and then the DIP is looked up in most forwarding engines to determine how to forward the packet. Since the RPF check for the SIP has already been performed on the ingress leaf switch 16(1), typically for packets received from fabric spine 18, the RFP check may be disabled. Thus, the cycles that are already available for two IP lookups can be effectively utilized for deriving the VLAN for the SIP on egress leaf switches (e.g., leaf switch 16(1)).

In various embodiments, for each subnet, a multicast-group may be reserved for each subnet. The group's replication set (e.g., each member of a replication set has a complete copy of the data from the other members) can contain leaf switches 16 across which the corresponding subnet spans. Since the number of subnets can be quite large, different subnets can intelligently share the same multicast-group according to various embodiments (e.g., similar to conventional (*, G) entry sharing rather than (S, G) entries for every unique source S and every unique multicast-group G). Note that the replication set and multicast-group allocation may not require any protocols to be run in either fabric spine 18 or leaf switches 16. The groups can be assigned based on the subnet membership across leaf switches 16. The subnet membership can be pushed down to leaf switches 16 via a management plane. Any additional routing protocol or central database support may not be needed as Layer 3 learning is handled in hardware.

Consider an example scenario where a local host (e.g., host 14(1) H1) on leaf switch 16(1) wants to communicate with a remote host (e.g., host 14(3) H3). Assume, merely for ease of illustration, that leaf switches 16(2) and 16(3) are on a common subnet. The subnet prefix entry (/24 address) of the remote subnet may be found in leaf switch 16(1)'s FIB/ADJ table. Consequently, the packet from host 14(1) may be sent out to the leaf switches (e.g., leaf switches 16(2) and 16(3)) across which the subnet spans. The replication itself can be done either on ingress leaf switch 16(1) or on the spine nodes in fabric spine 18.

If the replication is on the spine nodes, then the multicast replication group information may be communicated to fabric spine 18 in the outer overlay header, for example, by mapping the last 23 IP multicast addresses to the lower 23 bits of the MAC address. Once the replication is performed, the packet may reach leaf switches 16(2) and 16(3) in the specific subnet. At each egress leaf switch 16(2) and 16(3), the packets may be decapsulated and a lookup can be performed on the inner payload. Appropriate actions may be taken at egress leaf switches 16(2) and 16(3). For bidirectional traffic, as is the case with TCP and other protocols, the respective SIP/DIPs can be learnt on both ingress leaf switch 16(1) and egress leaf switch 16(3) when the destination host 14(3) (H3) responds. Subsequently, packets may not hit the subnet entry and no multicast replication may be required.

Layer 3 conversational learning can be implemented on a per subnet basis in some embodiments. For host facing ports, some additional security may be desired to prevent rogue hosts from pumping packets from different source IP addresses and overwhelming the host tables on the directly attached leaf switch. Suitable knobs may be provided to implement security. For example, source IP addresses may be learnt on specific ports that are explicitly marked as "trusted" by appropriate software. In addition, the number of unique source IP addresses learnt from a specific host-facing port in a particular time-interval can be constrained or rate-limited. Suitable software (e.g., on a control plane of leaf switches 16) can be notified of such activity so that appropriate action may be taken. Hardware can automatically block learning on this port until re-enabled by the software.

Embodiments of communication system 10 can have several advantages. For example, the hardware-based approach to learning IP addresses that may be part of active flows through leaf-switches 16 may be significantly faster than any software-based approaches.

In another example, there may be no packet out-of-order issues for any flows and any host can be guaranteed to talk to any other host in 1-hop. Embodiments of communication system 10 can be tolerant to dropping of Gratuitous Address Resolution Protocol (GARP) messages from a particular host 14 (e.g., host 14(1)) that may be lost. As long as host 14(1) is speaking, the SIP can be learnt in hardware. Traditionally, Layer 2 learning in hardware can be implemented within the same subnet. Embodiments of communication system 10 can perform Layer 3 learning in hardware that works across Subnet boundaries.

In an experimental setup, a topology with 3 ToRs (e.g., leaf switches 16(1)-16(3)) connected via a spine switch (e.g., fabric spine 18) may be constructed. A 1.1.1.0/24 subnet may be configured on the leaf switch 16(1) with switched virtual interfaces (SVIs) 1.1.1.1 and a 2.2.2.0/24 subnet may be configured on leaf switch 16(2) and 16(3) with SVIs 2.2.2.1. SVIs represent a logical Layer 3 interface on the switch. SVI may be designed to provide basic Layer 3 functions for the Layer 2 switch ports that belong to a specific VLAN. The SVI provides Layer 3 processing for packets from the switch ports associated with the VLAN. There can be one-to-one mapping between the VLAN and corresponding SVI (e.g., a single SVI can be mapped to a VLAN only).

A dump of the hardware FIB/ADJ tables on leaf switches 16(1)-16(3) may be captured. Two hosts 14(1) and 14(3) may be connected to leaf switch 16(1) and 16(3), respectively. Hosts 14(1) and 14(3) may have IP addresses 1.1.1.2/32 and 2.2.2.3/32 with corresponding SVIs set as default gateways. Ports connected to hosts 14(1) and 14(3) may be brought up, ensuring that no traffic is being sent out. A dump of the hardware FIB/ADJ tables on leaf switches 16(1)-16(3) may be reviewed to see the entries installed in hardware. Embodiments of communication system 10 may indicate that host addresses are present on the locally attached ToRs and the subnet prefix 2.2.2.0/24 is present on leaf switch 16(1) with 1.1.1.0/24 and 2.2.2.0/24 subnet prefixes on both leaf switches 16(2) and 16(3).

During the experiment, bidirectional traffic may be pumped from hosts 14(1) and 14(3) to each other (e.g., using IXIA® or other traffic generators). Packets received by each host 14(1) and 14(3) may be captured. In addition, a dump of the FIB hardware tables on leaf switches 16(1)-16(3) may be captured. According to embodiments of communication system 10, both host address entries may be present only on leaf switch 16(1) and 16(3) (with no change in programming on leaf switch 16(2)). Moreover, packet drops may not be seen in embodiments of communication system 10.

Turning to the infrastructure of communication system 10, the network topology can include any number of servers, virtual machines, switches, routers, and other nodes interconnected to form a large and complex network 12. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the architecture shown in FIG. 1 is simplified for ease of illustration. For example, network 12 may comprise access switches, aggregation switches, core switches to aggregate and distribute ingress (upstream traffic), and egress (downstream traffic) traffic, etc. A plurality of switches (virtual and/or physical) may be provided at each network level to achieve redundancy within network 12.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

According to various embodiments, learning modules 20 may be part of the hardware of leaf switches 16, for example, implemented on appropriate semiconductor chips (e.g., Application Specific Integrated Circuits (ASICs)). Learning modules 20 may include appropriate hardware components (e.g., memory elements, processors, etc.) and associated processing capability (e.g., from instructions stored in appropriate hardware components) to perform the operations described herein. In other embodiments, learning modules 20 may include applications and hardware that operate together to perform the operations described herein. For example, a portion of learning module 20 may be implemented in hardware, and another portion may be implemented in software, for example, as an application. As used herein, an "application" can be inclusive of an executable file comprising instructions that can be understood and processed on a computer, and may further include library modules loaded during execution, object files, system files, hardware logic, software logic, or any other executable modules. Learning module 20 may interface with the hardware of leaf switches 16 to perform the operations described herein.

Fabric spine 18 may include one or more switches (or routers and such other network elements with routing, bridging, and switching functionalities) and other suitable network elements based on particular network topology considerations. Switches in fabric spine 18 may forward packets from leaf switches 16, enabling a single tier fabric in many embodiments. In some network topologies, fabric spine 18 may include one level of switches (e.g., 2-tier fat tree topology); in other network topologies, fabric spine 18 may include multiple levels of switches (e.g., 3-tier fat tree topology). Number of switches in fabric spines 18 may be based in particular network topology and performance considerations. Virtually any number of switches may be used in fabric spine 18 within the broad scope of the embodiments of communication system 10.

Figure 2:
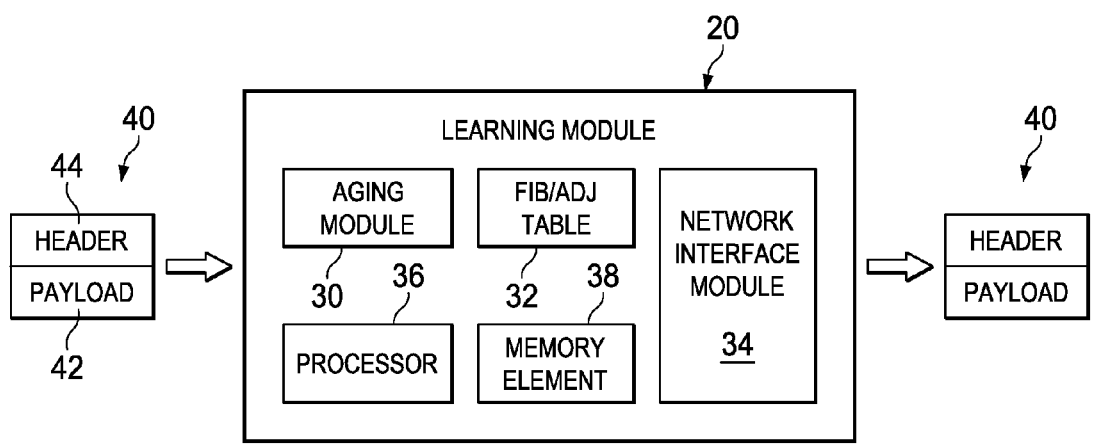
FIG. 2 is a simplified block diagram illustrating example details of the system in accordance with one embodiment.

Turning to FIG. 2, FIG. 2 is a simplified block diagram illustrating example operations that may be associated with embodiments of communication system 10. A representative learning module 20 includes an aging module 30, a FIB/ADJ table 32, a network interface module 34, a processor 36, and a memory element 38. Network interface module 34 may include suitable interfaces for Ethernet and other kinds of network interfaces, control, monitoring and data logging, and other features to enable it to receive a packet 40 from a source, and send out packet 40 to a destination. Packet 40 may include a payload 42 and a header 44. Header 44 may include information pertaining to the packet's source (e.g., SIP), destination (e.g., DIP), VLAN (e.g., VLAN-ID), etc. Payload 42 may include data and other content to be transferred from the source to the destination.

In various embodiments, packet 40 may be acted upon by learning module 20. A lookup may be performed in FIB/ADJ table 32 to determine if the SIP, DIP, and/or VLAN ID are present therein. If SIP is not present, the SIP may be entered and associated with the corresponding port. If DIP is not present, the corresponding subnet FIB entry VLAN ID may be looked up. Header 44 may be rewritten as appropriate (e.g., switch ID written thereto, etc.). Packet 40 may be forwarded on by network interface module 34 to fabric spine 18 to multicast to the leaf switches on the specific VLAN/subnet. If DIP is present, packet 40 may be unicast via fabric spine 18 to the specific destination.

In various embodiments, aging module 30 may reset the SIP/DIP hit bit in FIB/AJ table 32 when the SIP or DIP is identified in FIB/ADJ table 32. In some embodiments, aging module 30 may periodically age out inactive entries according to an aging criterion. In some embodiments, the aging criterion may be a predetermined time (e.g., 5 minutes, 30 minutes, etc.). Aging module 30 may determine whether the hit bit has been reset within the predetermined time. If there has been no reset, the entry may be deleted. In other embodiments, the aging criterion may be a predetermined threshold level of free space allocated to FIB/ADJ table 32. Aging module 30 may age out inactive entries when free space for storing new entries in FIB/ADJ table 32 is below a predetermined threshold (e.g., 10%). In some embodiments, aging module 30 may operate in software (e.g., software application may run suitable processes in the operating system); in other embodiments, aging module 30 may operate in hardware (e.g., instructions may be stored in memory and may be executed periodically as needed).

In various embodiments, FIB/ADJ table 32 may include information related to the network that may be stored in any appropriate format. For example, FIB/ADJ table 32 may include /32 addresses, /24 addresses and other prefixes. In some embodiments, FIB/ADJ table 32 may be implemented with fast hardware lookup mechanisms, such as ternary content addressable memory (TCAM). FIB/ADJ table 32 may contain numerous fields, including an association between SIP and corresponding port (if local SIP), and corresponding source node (if remote SIP). Similarly, FIB/ADJ table 32 may contain numerous fields, including an association between DIP and corresponding port (if local DIP) and corresponding destination node (if remote DIP). In addition, FIB/ADJ table 32 can include status information, SIP/DIP hit bit, and other suitable information based on particular configuration needs. In some embodiments, FIB/ADJ table 32 may include two separate tables (e.g., a FIB table and an adjacency table). In other embodiments, FIB/ADJ table 32 may be a single table including information typically comprised in a regular FIB table and adjacency table. In various embodiments, FIB/ADJ table 32 may be implemented in hardware (e.g., in a Static Random Access Memory (SRAM), or Content Addressable Memory (CAM)) of representative leaf switch 16.

In many embodiments, learning module 20 may use processor 36 and memory element 38 for performing the operations described herein. In some embodiments, FIB/ADJ table 32 may be implemented in memory element 38. In other embodiments, FIB/ADJ table 32 may be stored separately (e.g., in other memory elements) and accessed as needed based on particular switch configurations.

Figure 3A:
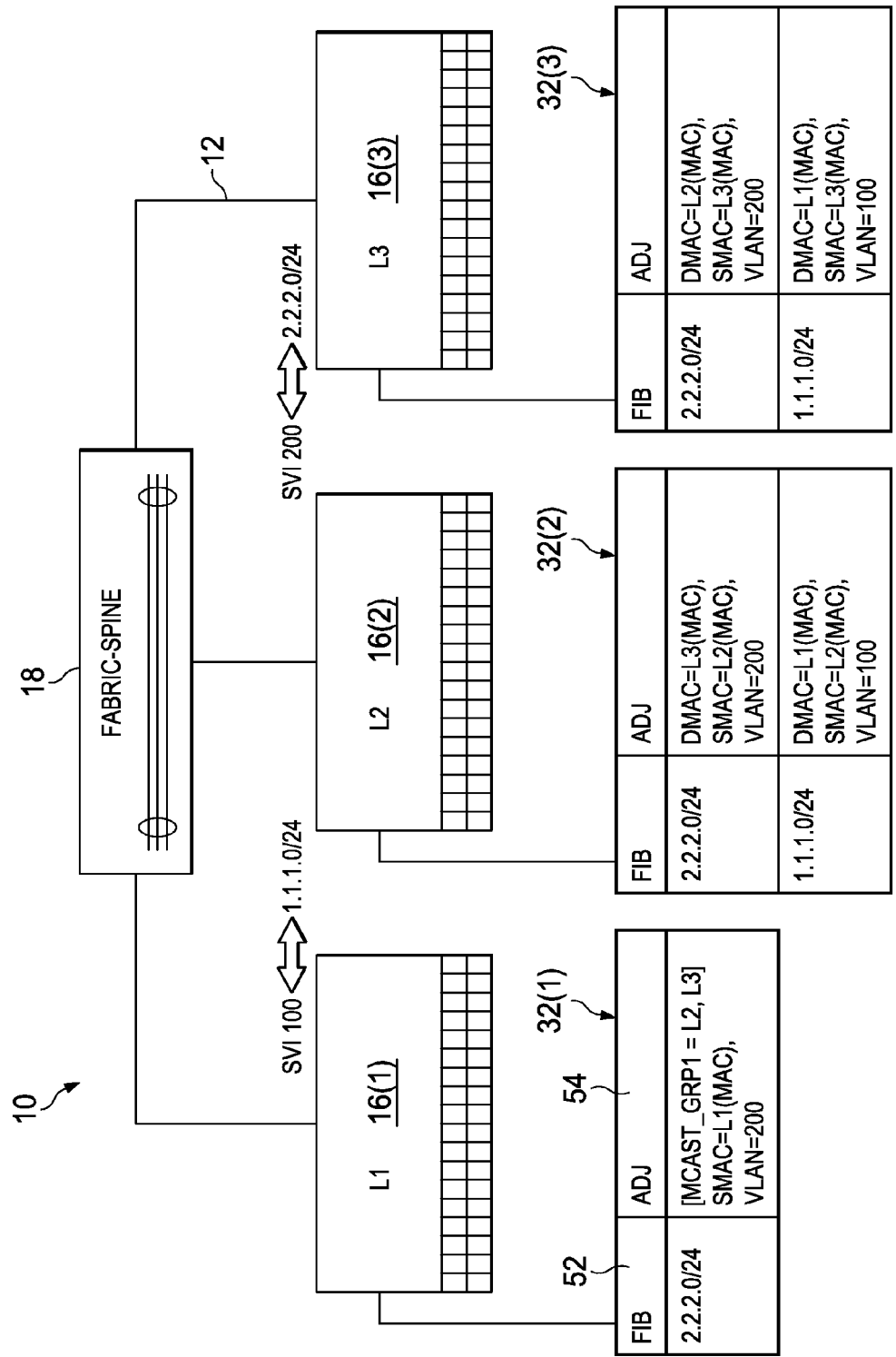
FIGS. 3A and 3B are simplified block diagrams illustrating further example details of the system in accordance with one embodiment.

Turning to FIG. 3A, FIG. 3A is a simplified block diagram illustrating an example embodiment of communication system 10 in a first configuration. In the first configuration, no hosts 14 may be activated or connected to any leaf switches 16(1)-16(3). Leaf switch 16(1) (e.g., L1) may be included in a VLAN 100 with a corresponding SVI 1.1.1.0/24. Leaf switches 16(2) and 16(3) may be included in another VLAN 200 with corresponding SVI 2.2.2.0/24. FIB/ADJ table 32(1) of leaf switch 16(1) may include two fields: FIB field 52 and ADJ field 54. The fields are merely representations, to illustrate example information included therein. In a general sense, FIB/ADJ table 32 may include any number of fields, populated with corresponding information, according to particular hardware, network, and/or configuration considerations. Likewise, FIB/ADJ tables 32(2) and 32(3) may be associated with leaf switches 16(2) and 16(3), respectively.

In operation, a network administrator, management interface, or other mechanisms (e.g., suitable protocols) may configure FIB/ADJ tables 32(1)-32(3) with subnet information. For example, FIB/ADJ table 32(1) may be configured with VLAN information corresponding to the other two leaf switches 16(2) and 16(3) in network 12. FIB field 52 may indicate SVI 2.2.2.0/24, and ADJ field 54 may indicate the following information (among others): multicast group 1 includes leaf switches 16(2) and 16(3) ("[MCAST_GRP1=L2, L3]"); source MAC address for any packet sent to SVI 2.2.2.0/24 corresponds to MAC address of leaf switch 16(1) ("SMAC=L1(MAC)"); VLAN corresponding to SVI 2.2.2.0/24 is 200 ("VLAN=200").

Likewise, FIB/ADJ tables 32(2) and 32(3) may be populated with appropriate information. FIB/ADJ table 32(2) may indicate that for SVI 2.2.2.0/24 as indicated in the FIB field, the corresponding parameters in the ADJ field include: destination MAC address corresponds to MAC address of leaf switch 16(3); source MAC address corresponds to MAC address of leaf switch 16(2); VLAN corresponds to 200. For SVI 1.1.1.0/24, destination MAC address corresponds to MAC address of leaf switch 16(1); source MAC address corresponds to MAC address of leaf switch 16(2), and VLAN corresponds to 100. FIB/ADJ table 32(3) may indicate that for SVI 2.2.2.0/24 as indicated in the FIB field, the corresponding parameters in the ADJ field include: destination MAC address corresponds to MAC address of leaf switch 16(2); source MAC address corresponds to MAC address of leaf switch 16(3); VLAN corresponds to 200. For SVI 1.1.1.0/24, destination MAC address corresponds to MAC address of leaf switch 16(1); source MAC address corresponds to MAC address of leaf switch 16(3), and VLAN corresponds to 100.

The example embodiment includes three leaf switches 16(1)-16(3) merely for ease of illustration. Any number of leaf switches 16 may be included in communication system 10 within the broad scope of the embodiments. It may be noted that in embodiments wherein network 12 includes myriad leaf switches 16, respective FIB/ADJ tables 32 may be configured with corresponding VLAN information of substantially all leaf switches 16 in network 12.

Figure 3B:
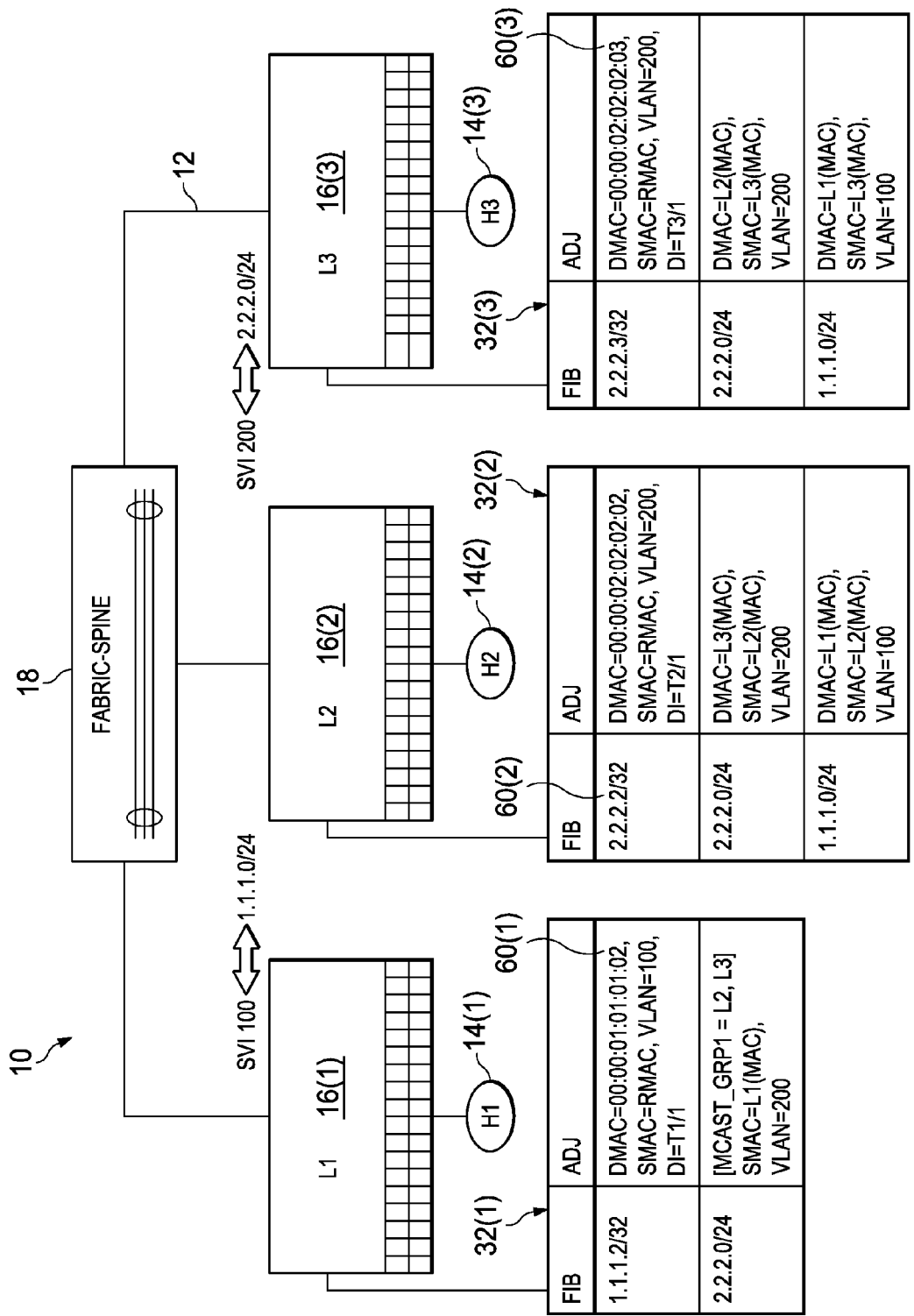

Turning to FIG. 3B, FIG. 3B is a simplified block diagram illustrating the example embodiment of communication system 10 shown in FIG. 3A in a second configuration. In the second configuration hosts 14(1), 14(2) and 14(3) (e.g., corresponding to H1, H2, and H3, respectively) are connected to leaf switches 16(1), 16(2) and 16(3), respectively. FIB/ADJ table 32(1) may include a new entry 60(1), corresponding to directly connected host 14(1). Entry 60(1) may indicate the /32 address of host 14(1), for example, as 1.1.1.2/32, corresponding to destination MAC address of 00:00:01:01:01:02; source MAC address being the same as router MAC address, VLAN being 100, and device interface being T1/1.

Likewise, FIB/ADJ tables 32(2) and 32(3) may include new entries 60(2), and 60(3), respectively, corresponding to respective directly connected hosts 14(2) and 14(3). Entry 60(2) may indicate the /32 address of host 14(2), for example, as 2.2.2.2/32, corresponding to destination MAC address of 00:00:02:02:02:02; source MAC address being the same as router MAC address, VLAN being 200, and device interface being T2/1. Entry 60(3) may indicate the /32 address of host 14(3), for example, as 2.2.2.3/32, corresponding to destination MAC address of 00:00:02:02:02:03; source MAC address being the same as router MAC address, VLAN being 200, and device interface being T3/1.

Figure 4A:
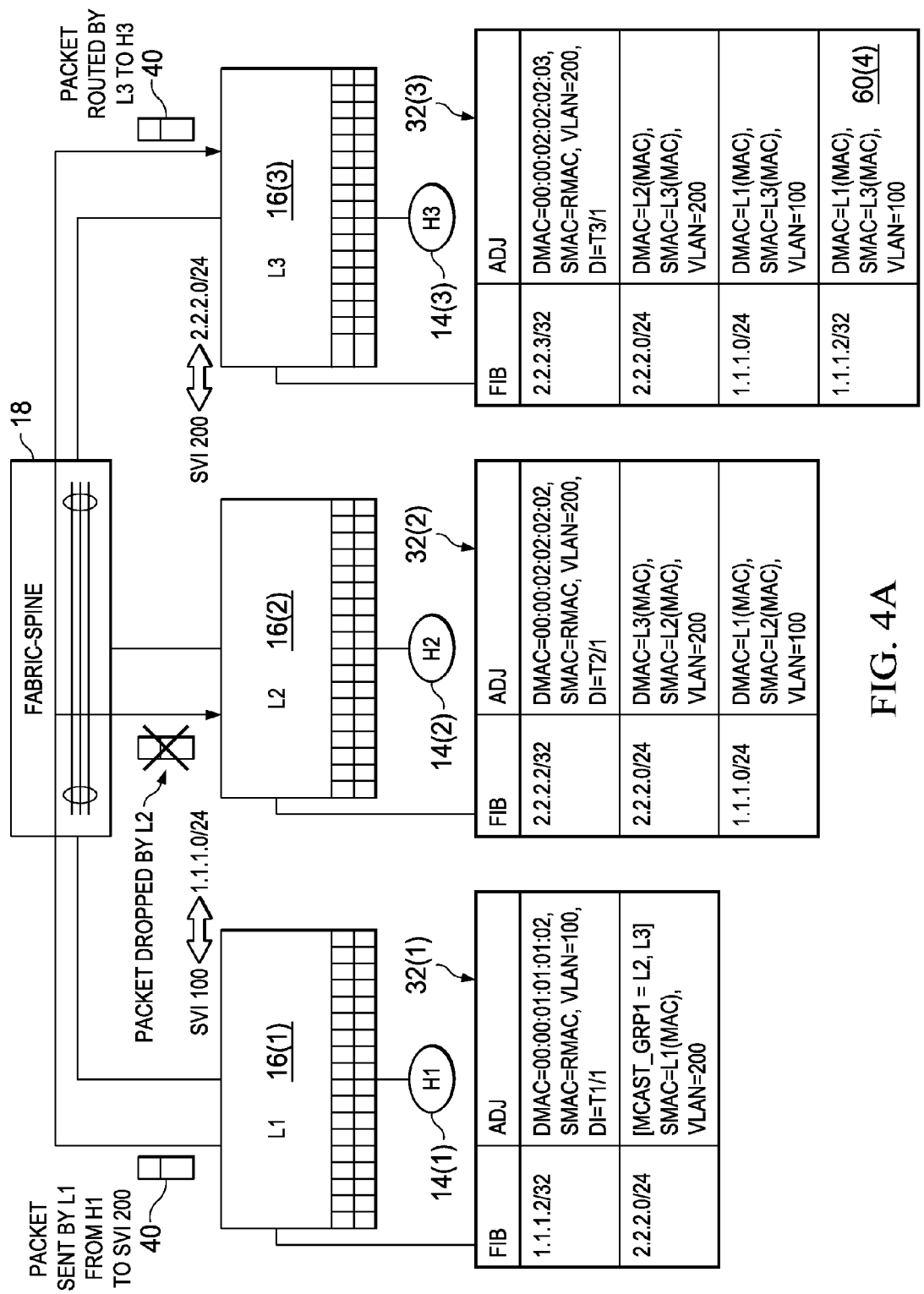
FIGS. 4A and 4B are simplified block diagrams illustrating further example details of the system in accordance with one embodiment.

Turning to FIG. 4A, FIG. 4A illustrates a simplified block diagram illustrating an example embodiment of communication system 10 involved in communicating over network 12. Packet 40 may be sent by host 14(1) to host 14(3) at destination 2.2.2.3/32. Leaf switch 16(1) may inspect the packet header and lookup FIB/ADJ table 32(1). A determination may be made that the /32 address of the destination (2.2.2.3/32) is not available in FIB/ADJ table 32(1). However, the corresponding /24 address in FIB/ADJ table 32(1) points to SVI 2.2.2.0/24 and associated destination leaf switches 16(2) and 16(3). Leaf switch 16(1) may multicast packet 40 to leaf switches 16(2) and 16(3) over fabric spine 18.

Packet 40 may arrive at both leaf switches 16(2) and 16(3). Leaf switch 16(2) may lookup FIB/ADJ table 32(2), determine that the 2.2.2.3/32 address of the destination is not available in FIB/ADJ table 32(2), and subsequently drop packet 40. Leaf switch 16(3) may inspect FIB/ADJ table 32(3) and find a hit corresponding to host 14(3). A new entry 60(4) may be entered in FIB/ADJ table 32(3) corresponding to the /32 address of the source, host 14(1). Entry 60(4) may indicate that 1.1.1.2/32 address is associated with destination MAC address corresponding to leaf switch 16(1), among other information. Subsequently, leaf switch 16(3) may route packet 40 to host 14(3).

Figure 4B:
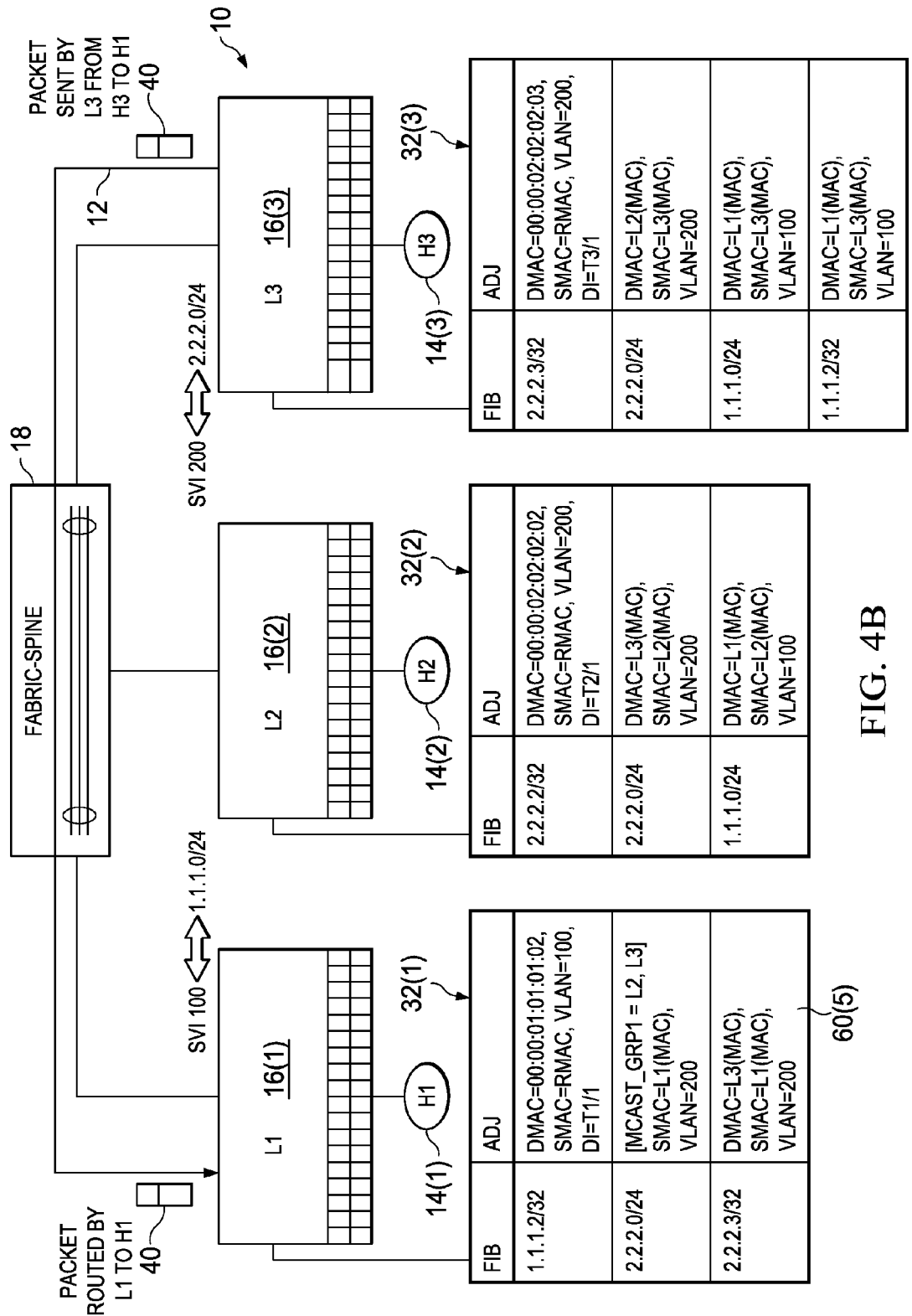

Turning to FIG. 4B, FIG. 4B illustrates a simplified block diagram illustrating an example embodiment of communication system 10 involved in communicating over network 12. Host 14(3) may respond to host 14(1) with another packet 40. The destination address of packet 40 may indicate 1.1.1.2/32, which can be found in FIB/ADJ table 32(3), as described with reference to FIG. 4A. Packet 40 may be subsequently unicast to leaf switch 16(1). Leaf switch 16(1) may inspect the packet header and determine the /32 address (e.g., 2.2.2.3/32) of the source. A lookup in FIB/ADJ table 32(1) may indicate that the /32 address (2.2.2.3/32) of the source is not present therein. A new entry 60(5) may be entered in FIB/ADJ table 32(1). Entry 60(5) may include /32 address (2.2.2.3/32) of host 14(3) and corresponding leaf switch information. Thus, leaf switch 16(1) and 16(3) may learn the /32 address of hosts 14(1) and 14(3) in hardware, based upon a network traffic between them.

Figure 5:
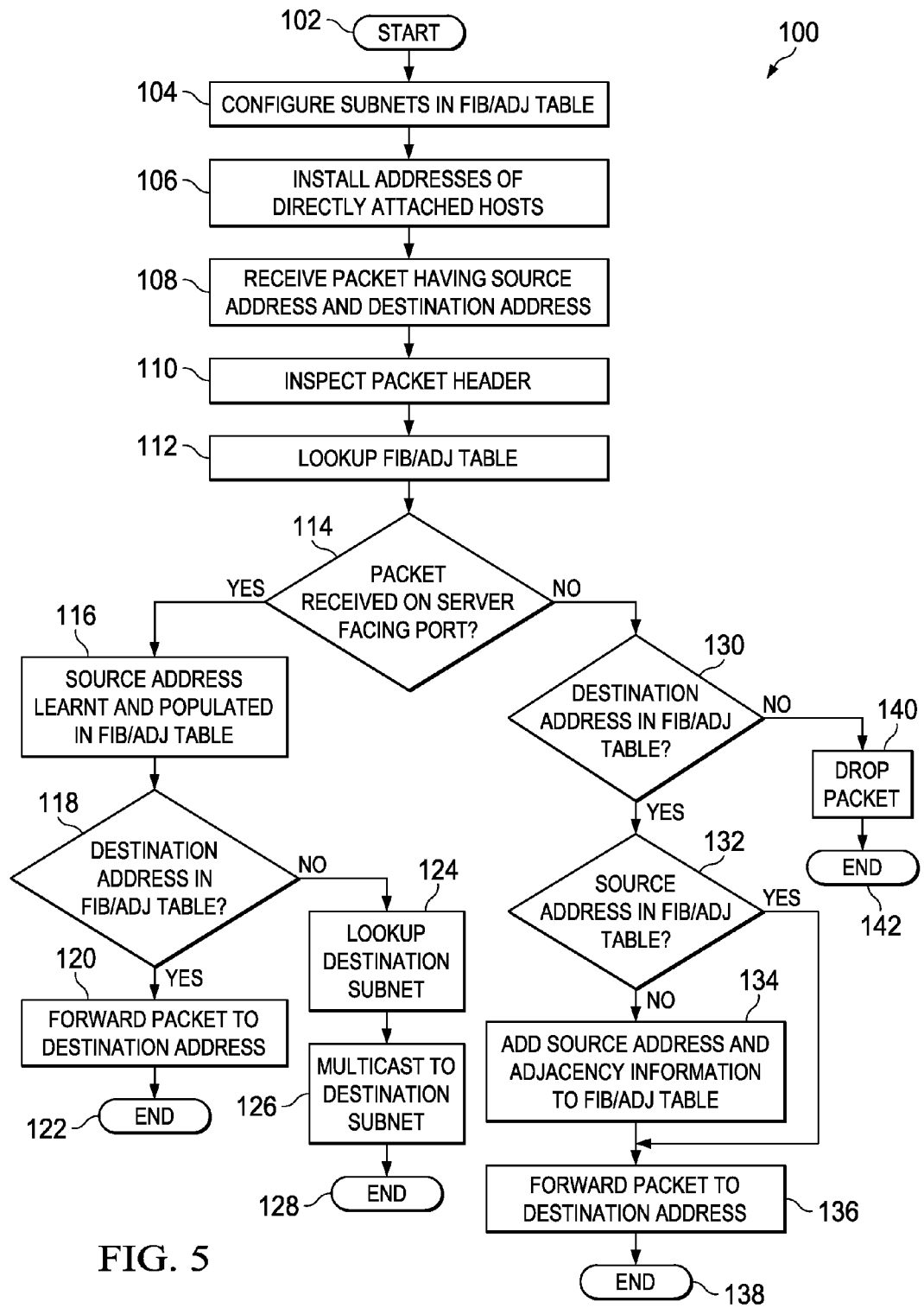
FIG. 5 is a simplified flow diagram illustrating example operations that may be associated with an embodiment of the system.

Turning to FIG. 5, FIG. 5 is a simplified flow diagram illustrating example operations that may be associated with embodiments of communication system 10. Operations 100 may start at 102, when network 12 is instantiated (e.g., by bringing up multiple interconnected leaf switches 16 and fabric spine 18). At 104, subnets may be configured in FIB/ADJ tables. For example, subnet prefixes (e.g., /24 addresses) of subnets may be installed in FIB/ADJ table 32(1) of leaf switch 16(1). At 106, /32 addresses of directly attached hosts 14 (e.g., host 14(1)) may be installed in FIB/ADJ table 32(1) of leaf switch 16(1). At 108, packet 40 may be received at leaf switch 16(1). Packet 40 may include a source /32 address and a destination /32 address. At 110, packet header 44 of packet 40 may be inspected. At 112, FIB/ADJ table 32(1) may be looked up. At 114, a determination may be made whether packet 40 is received on a server facing port (e.g., port connected to directly attached hosts).

If packet 40 is received on a server facing port, at 116, the source /32 address may be unconditionally learnt and populated in FIB/ADJ table 32(1) (if not already present therein). At 118, a determination may be made whether the destination /32 address is found in FIB/ADJ table 32(1). If the destination /32 address is found in FIB/ADJ table 32(1) (e.g., corresponding host directly connected to leaf switch 16(1)), the packet may be forwarded to the destination address at 120. If the destination /32 address is not found in FIB/ADJ table 32(1) (e.g., corresponding host is remote), a subnet corresponding to the destination /32 address may be looked up in FIB/ADJ table 32(1) at 124. At 126, packet 40 may be multicast to the destination subnet. The operations may end at 128.

Turning back to 114, if packet 40 is not received on a server facing port (e.g., received on a spine facing port), a determination may be made at 130 whether the destination /32 address is found in FIB/ADJ table 32(1). If the destination address is found, at 132, a determination may be made whether the source /32 address is found in FIB/AFJ table 32(1). If the source /32 address is not found in FIB/ADJ table 32(1) (e.g., corresponding host is remote, and is sending traffic for a first time to leaf switch 16(1)), at 134, the source /32 address and corresponding adjacency information may be added to FIB/ADJ table 32(1) and packet 40 may be forwarded to the destination /32 address found in FIB/ADJ table 32(1) at 136. The operations may end at 138. Turning back to 132, if the source /32 address is found in FIB/ADJ table 32(1) (e.g., corresponding host is local and already discovered, or the corresponding remote host has been seen previously by leaf switch 16(1)), operations may move to 136, and packet 40 may be forwarded to the destination /32 address found in FIB/ADJ table 32(1). Turning back to 130, destination /32 address is not found (e.g., corresponding destination host is not local), packet 40 may be dropped at 140 and no learning of source /32 address may be performed. The operations may end at 142. Note that when source /32 address is learnt, appropriate hit bits corresponding to SIP and DIP may be set/reset in hardware, indicating an active flow.

Figure 6:
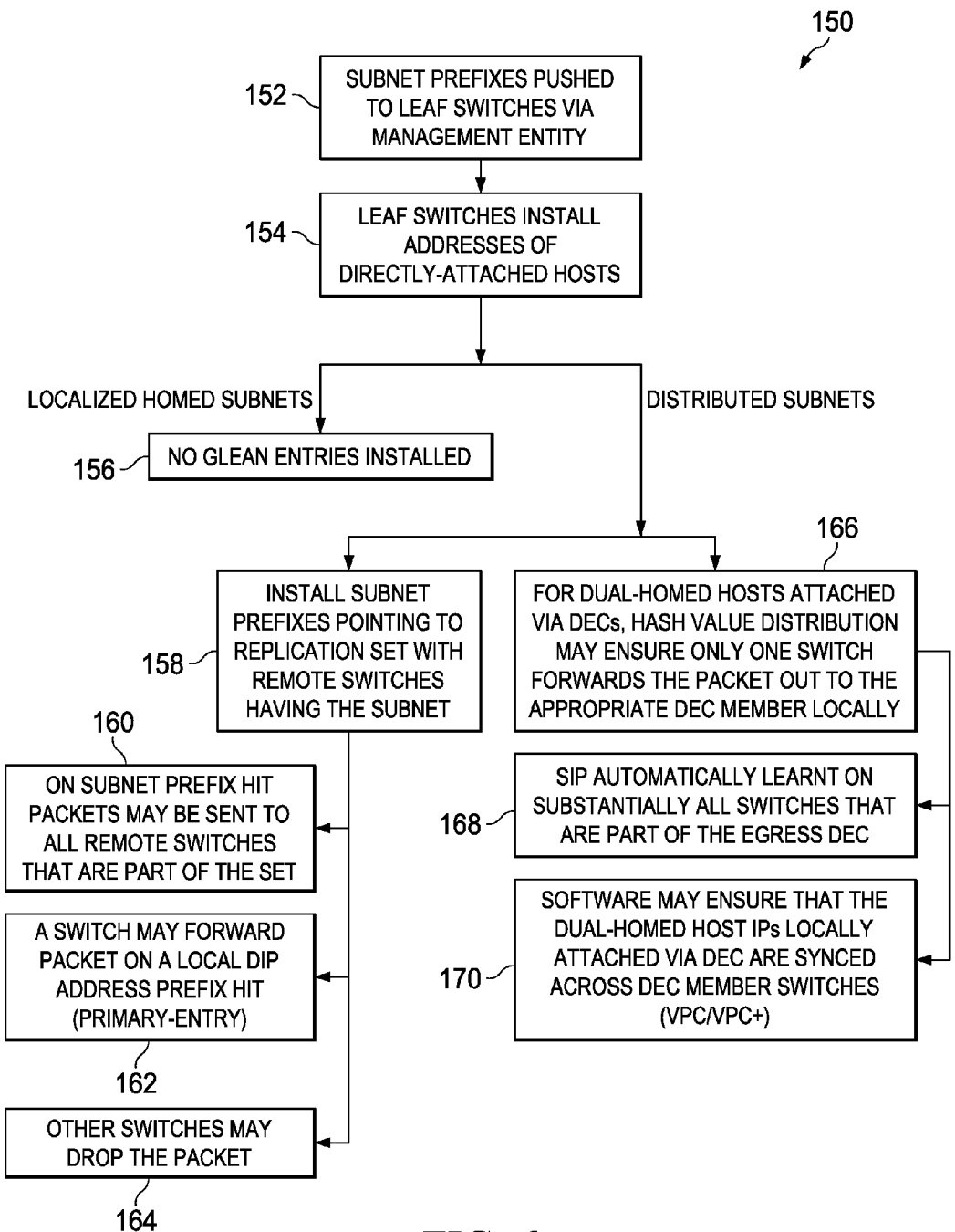
FIG. 6 is a simplified flow diagram illustrating further example operations that may be associated with an embodiment of the system.

Turning to FIG. 6, FIG. 6 is a simplified flow diagram illustrating example operations that may be associated with embodiments of communication system 10. Operations 150 may include 152, at which time, for a given leaf switch 16(1), subnet prefixes are pushed from a management entity (e.g., configuration software, network management application, etc.). At 154, leaf switch 16(1) may install addresses of directly attached hosts 14. The operations may bifurcate for locally homed subnets (e.g., natively homed only on leaf switch 16(1)) and distributed subnets. At 156, no glean entries may be installed. (Glean entries refer to adjacencies created when leaf switch 16(1) does not know that destination device's /32 address, but knows that the destination IP's subnet is directly connected to leaf switch 16(1) itself).

For distributed subnets, the operations may bifurcate for dual-homed subnets attached via Distributed Ether-Channels (DEC) (also called Link Aggregation Groups (LAGs) or Port-channels) and other subnets. At 158, subnet prefixes pointing to replication sets with remote switches having the subnets may be installed in leaf switch 16(1). Such installation can cause, for example, 160, at which time, subnet prefix hit packets may be sent to the remote switches that are part of the subnet; 162, at which time, a switch may forward the packet on a local DIP address prefix hit (e.g., primary entry); and 164, at which time, other switches may drop the packet.

At 166, for dual-homed hosts attached via DEC, hash value distribution may ensure that only one switch forwards the packet to the appropriate DEC member locally. Such operations, may cause, for example, 168, at which time, SIP may be automatically learnt on substantially all switches that are part of the egress DEC; and 170, at which time, software may ensure that the dual-homed host IP's locally attached via DEC are synced across DEC member switches (e.g., with virtual PortChannels (vPC) or vPC+).

Figure 7:
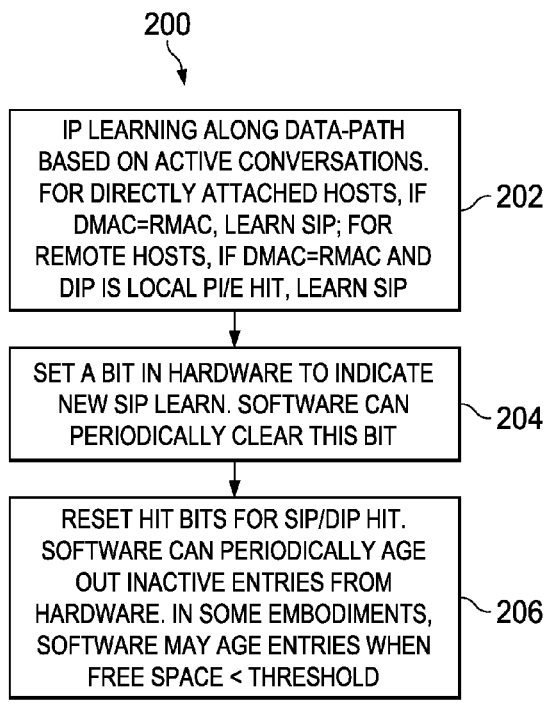
FIG. 7 is a simplified flow diagram illustrating yet other operations that may be associated with an embodiment of the system.

Turning to FIG. 7, FIG. 7 illustrates a simplified flow diagram illustrating example operations that may be associated with aging in embodiments of communication system 10. Operations 200 may include 202, at which time, IP learning along data path may be based on active conversations. For directly attached hosts, if DMAC is the same as Router MAC (RMAC), SIP may be learnt in hardware (e.g., in FIB/ADJ table 32). For remote hosts, if DMAC is the same as RMAC, and DIP is local PI/E hit (e.g., destination host is directly attached to leaf switch), SIP may be learnt.

At 204, a bit ("learnt bit") in hardware may be set to indicate new SIP learn. Appropriate software (e.g., in aging module 30) can periodically clear this bit. At 206, hit bits for SIP/DIP hits may be reset (e.g., a hit bit may correspond to SIP and another hit bit may correspond to DIP). Software (e.g., in aging module 30) may periodically age out inactive entries from hardware. In some embodiments, software may age entries when free space is less than a predetermined threshold (e.g., 10%).

Figure 8:
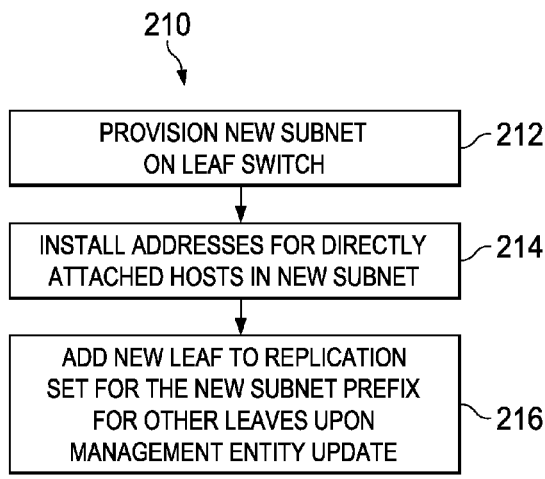
FIG. 8 is a simplified flow diagram illustrating yet other example operations that may be associated with an embodiment of the system.

Turning to FIG. 8, FIG. 8 illustrates a simplified flow diagram illustrating example operations that may be associated with embodiments of communication system 10. Operations 210 may include 212, at which time, a new VLAN is provisioned on leaf switch 16(1). At 214, /32 addresses for directly attached hosts in the new VLAN may be installed in FIB/ADJ table 32(1). At 216, new leaf switch 16(1) may be added to replication set for the new subnet prefix for other leaves upon a management entity update.

Figure 9:
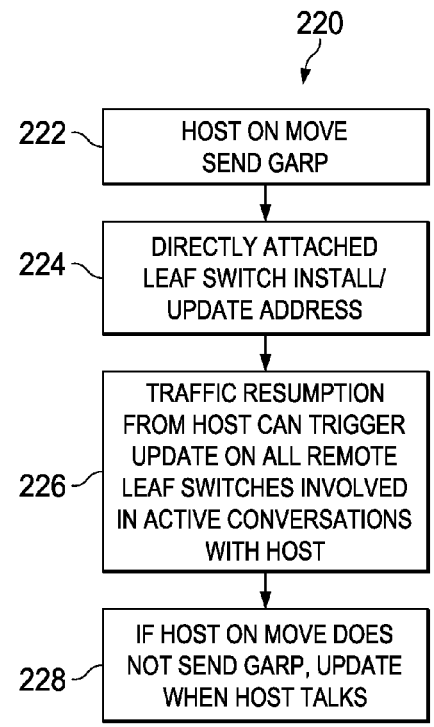
FIG. 9 is a simplified flow diagram illustrating yet other example operations that may be associated with an embodiment of the system.

Turning to FIG. 9, FIG. 9 illustrates a simplified flow diagram illustrating example operations that may be associated with embodiments of communication system 10. Operations 220 may include 222, at which time, host 14(1) on move may send a GARP message. For example, host 14(1) may be a virtual machine (VM) migrating from one server on leaf switch 16(1) to another server of leaf switch 16(2). At 224, directed attached leaf switch 16(2) may install and/or update /32 address of host 14(1). At 226, traffic resumption from host 14(1) on leaf switch 16(2) may trigger an update of the FIB/ADJ entry associated with host 14(1) on substantially all remote switches involved in active conversation with host 14(1). At 228, if host 14(1) on move does not send GARP message, entry on directly attached leaf switch 16(2) may also be installed and/or updated when host 14(1) talks.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, learning module 20. In some embodiments, one or more of these features may be implemented in hardware, provided external to these elements, or consolidated in any appropriate manner to achieve the intended functionality. The various network elements (e.g., learning module 20) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, learning module 20 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 38) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 36) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 38) for storing information to be used in achieving operations as outlined herein. These devices may further keep information in any suitable type of non-transitory storage medium (e.g., random access memory (RAM), read only memory (ROM), field programmable gate array (FPGA), EPROM, EEPROM, etc.), software, hardware, or in any other suitable component, device, element, or object where appropriate and based on particular needs. The information being tracked, sent, received, or stored in a communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a packet at a leaf switch in a network, the packet including a source address and a destination address, wherein the source address indicates an Internet Protocol (IP) address of a source host that sent the packet, wherein the destination address indicates an IP address of a destination host to which the packet is destined, wherein when a destination Media Access Control (DMAC) address of the packet is a MAC address of the leaf switch, the method further comprises:
   looking up the destination address and the source address in a Forwarding Information Base/adjacency (FIB)/(ADJ) table implemented in a hardware of the leaf switch;
   adding the source address and corresponding adjacency information to the FIB/ADJ table when the destination address is found in the FIB/ADJ table and the source address is not found in the FIB/ADJ table; and
   forwarding the packet to the destination host, wherein the source address and the destination address are 32 bit IP version 4 addresses.

2. The method of claim 1, further comprising:
   dropping the packet when the destination address and the source address are not found in the FIB/ADJ table.

3. The method of claim 1, further comprising:
   looking up a destination subnet having a subnet prefix corresponding to the destination address; and
   multicasting the packet to the destination subnet when the destination address is not found in the FIB/ADJ table and the source address is found in the FIB/ADJ table.

4. The method of claim 1, further comprising:
   configuring subnet prefixes of subnets in the network in the FIB/ADJ table.

5. The method of claim 1, further comprising:
   installing addresses of hosts connected to the leaf switch.

6. The method of claim 1, further comprising:
   setting a learnt bit in the FIB/ADJ table when the source address is added; and
   resetting a corresponding hit bit when the destination address or the source address is found in the FIB/ADJ table.

7. The method of claim 6, further comprising:
   deleting an entry in the FIB/ADJ table corresponding to the destination address and the source address according to an aging criterion.

8. The method of claim 7, wherein the aging criterion is a predetermined time interval.

9. The method of claim 7, wherein the aging criterion is a predetermined threshold level of free space allocated to the FIB/ADJ table.

10. The method of claim 1, wherein the source address is learnt on leaf switches that are part of a Distributed Ether Channel (DEC), through which a destination dual-homed server is reached.

11. A non-transitory computer readable medium that includes instructions for execution and when executed by a processor of a leaf switch in a network, is configured to perform operations comprising:

receiving a packet including a source /32 address and a destination address, wherein the source address indicates an Internet Protocol (IP) address of a source host that sent the packet, wherein the destination address indicates an IP address of a destination host to which the packet is destined, wherein when a destination Media Access Control (DMAC) address of the packet is a MAC address of the leaf switch, the operations further comprises:

looking up the destination address and the source address in a Forwarding Information Base/adjacency (FIB)/(ADJ) table implemented in a hardware of the leaf switch;

adding the source address and corresponding adjacency information to the FIB/ADJ table when the destination address is found in the FIB/ADJ table and the source address is not found in the FIB/ADJ table; and forwarding the packet to the destination host, wherein the source address and the destination address are 32 bit IP version 4 addresses.

12. The non-transitory computer readable medium of claim 11, the operations further comprising:

dropping the packet when the destination address and the source address are not found in the FIB/ADJ table.

13. The non-transitory computer readable medium of claim 11, the operations further comprising:

looking up a destination subnet having a subnet prefix corresponding to the destination address; and multicasting the packet to the destination subnet when the destination address is not found in the FIB/ADJ table and the source address is found in the FIB/ADJ table.

14. The non-transitory computer readable medium of claim 11, the operations further comprising:

configuring subnet prefixes of subnets in the network in the FIB/ADJ table.

15. The non-transitory computer readable medium of claim 11, the operations further comprising:

installing addresses of hosts connected to the leaf switch.

16. An apparatus, comprising:

a memory element for storing data; and a processor configured to execute instructions associated with the data, wherein the processor and the memory element cooperate, such that the apparatus is configured as a leaf switch for:

receiving a packet including a source address and a destination address, wherein the source address indicates an Internet Protocol (IP) address of a source host that sent the packet, wherein the destination address indicates an IP address of a destination host to which the packet is destined, wherein when a destination Media Access Control (DMAC) address of the packet is a MAC address of the apparatus, the apparatus is further configured for:

looking up the destination address and the source address in a Forwarding Information Base/adjacency (FIB)/(ADJ) table implemented in a hardware of the apparatus;

adding the source address and corresponding adjacency information to the FIB/ADJ table when the destination address is found in the FIB/ADJ table and the source address is not found in the FIB/ADJ table; and forwarding the packet to the destination host, wherein the source address and the destination address are 32 bit IP version 4 addresses.

17. The apparatus of claim 16, further configured for:

dropping the packet when the destination address and the source address are not found in the FIB/ADJ table.

18. The apparatus of claim 16, further configured for:

looking up a destination subnet having a subnet prefix corresponding to the destination address; and multicasting the packet to the destination subnet when the destination address is not found in the FIB/ADJ table and the source address is found in the FIB/ADJ table.

19. The apparatus of claim 16, further configured for:

configuring subnet prefixes of subnets in the network in the FIB/ADJ table.

20. The apparatus of claim 16, further configured for:

installing addresses of hosts connected to the apparatus.

\* \* \* \* \*